US008635700B2

(12) United States Patent
Richard et al.

(10) Patent No.: US 8,635,700 B2
(45) Date of Patent: Jan. 21, 2014

(54) DETECTING MALWARE USING STORED PATTERNS

(75) Inventors: Matthew Richard, Holden, MA (US); Jesse J. Lee, Allen, TX (US); Monty D. McDougal, St. Paul, TX (US); Randy S. Jennings, Plano, TX (US); William E. Sterns, Dallas, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/312,716

(22) Filed: Dec. 6, 2011

(65) Prior Publication Data
US 2013/0145471 A1 Jun. 6, 2013

(51) Int. Cl.
G06F 15/18 (2006.01)
G06F 11/00 (2006.01)

(52) U.S. Cl.
USPC .......... 726/24; 726/22; 726/23; 726/25; 726/26; 726/1; 713/187; 713/188; 713/191; 707/690; 709/203; 709/225; 709/226; 717/168; 370/474

(58) Field of Classification Search
USPC .......................................................... 726/23
See application file for complete search history.

(56) References Cited

U.S. PATENT DOCUMENTS

| 8,060,577 B1 | 11/2011 | Conrad |
| 8,281,403 B1* | 10/2012 | Asheghian et al. ............. 726/25 |
| 2003/0046558 A1 | 3/2003 | Teblyashkin et al. |
| 2005/0132227 A1* | 6/2005 | Reasor et al. ................ 713/201 |
| 2007/0094734 A1* | 4/2007 | Mangione-Smith et al. ... 726/24 |
| 2008/0034073 A1* | 2/2008 | McCloy et al. ............... 709/223 |
| 2009/0126012 A1 | 5/2009 | Treadwell et al. |
| 2010/0064369 A1 | 3/2010 | Stolfo et al. |
| 2010/0131473 A1* | 5/2010 | Bjork et al. .................. 707/690 |
| 2010/0192222 A1* | 7/2010 | Stokes et al. ................... 726/22 |

OTHER PUBLICATIONS

"*About Code Papers Links*", http://www.reconstructer.org/code.html, 2 pages, Printed Mar. 9, 2011.
"*YARA in a nutshell*", yara-project, A malware identification and classification tool, yara-project—Project Hosting on Google Code, http://code.google.com/p/yara-project/, 3 pages, Printed Mar. 9, 2011.
"International Application Serial No. PCT/US2012/068178, International Search Report mailed Feb. 15, 2013", 2 pgs.
"International Application Serial No. PCT/US2012/068178, Written Opinion mailed Feb. 15, 2013", 4 pgs.

* cited by examiner

*Primary Examiner* — Nathan Flynn
*Assistant Examiner* — Bryan Wright
(74) *Attorney, Agent, or Firm* — Schwegman, Lundberg & Woessner, P.A.

(57) ABSTRACT

In one embodiment, a method includes identifying a plurality of portions of a file and comparing the plurality of portions of the file to a plurality of stored patterns. The plurality of stored patterns include portions of known malware. The method also includes determining, from the plurality of portions of the file and based on the comparing of the plurality of portions of the file to the plurality of stored patterns, a set of matching portions. The set of matching portions include one or more of the plurality of portions of the file. In addition, the method includes determining a score for each portion in the set of matching portions and providing information regarding the set of matching portions. The information includes the scores determined for each portion of the set of matching portions.

18 Claims, 3 Drawing Sheets

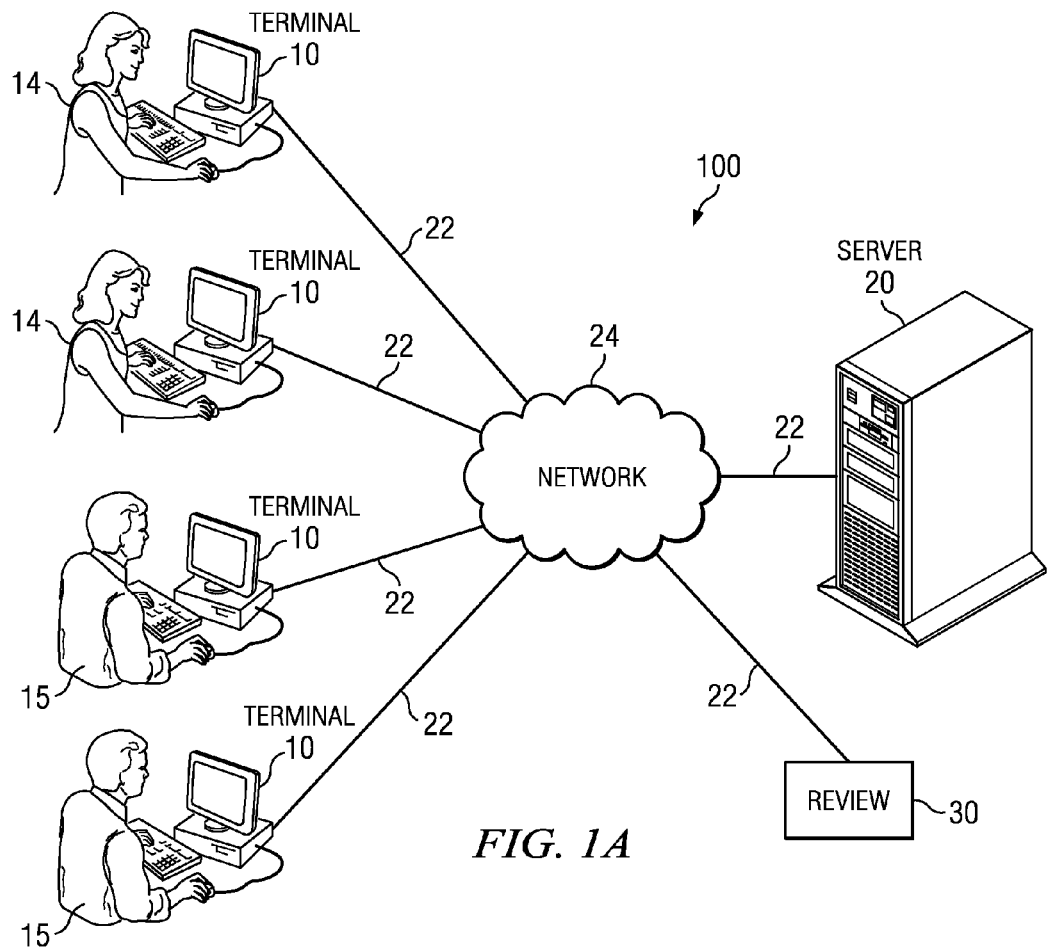
*FIG. 1A*
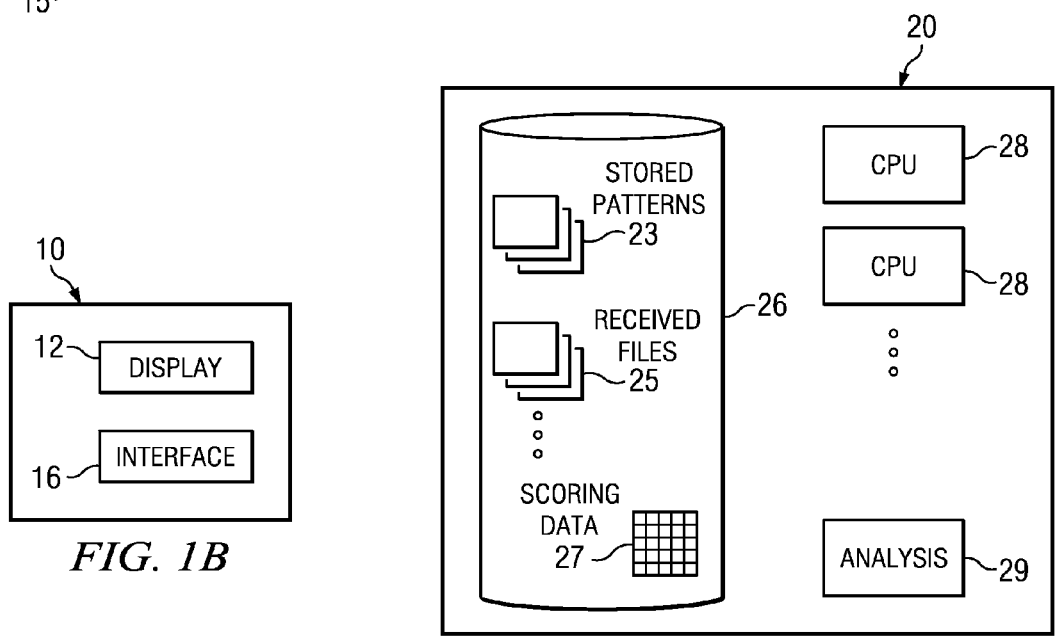
*FIG. 1B*
*FIG. 1C*

DETECTING MALWARE USING STORED PATTERNS

BACKGROUND

Malware (such as viruses, trojans, and other malicious software) has become increasingly difficult to protect against. Various methods have been used to combat malware but more sophisticated malware continues to abound. Malware has been included in often-used types of files, such as word processing, spreadsheet, presentation, and multimedia files. Some malware is difficult to detect using traditional methods because they are embedded in such files. The use of virus signatures to detect malware has been prevalent, but the signatures are very specific and are difficult to maintain in light of obfuscation and other techniques employed by malware authors. This leaves systems vulnerable.

SUMMARY

In one embodiment, a method executed by at least one processor includes identifying a plurality of portions of a file and comparing the plurality of portions of the file to a plurality of stored patterns. The plurality of stored patterns include portions of known malware. The method also includes determining, from the plurality of portions of the file and based on the comparing of the plurality of portions of the file to the plurality of stored patterns, a set of matching portions. The set of matching portions include one or more of the plurality of portions of the file. In addition, the method includes determining a score for each portion in the set of matching portions and providing information regarding the set of matching portions. The information includes the scores determined for each portion of the set of matching portions.

In some embodiments, each score may be a ranking of a likelihood that each respective portion in the set of matching portions is associated with malware. Comparing the plurality of portions of the file to the plurality of stored patterns may include comparing byte sequences or text strings. Each score may be determined based on the frequency with which each respective portion in the set of matching portions occurs in the plurality of stored patterns. The information may be provided to a human analyst to assist in determining whether the file is malware.

In one embodiment, a system includes at least one computer-readable medium and one or more processors that are configured to identify a plurality of portions of a file. The one or more processors are configured to compare the plurality of portions of the file to a plurality of stored patterns. The plurality of stored patterns include portions of known malware. The one or more processors are configured to determine, from the plurality of portions of the file and based on the comparing of the plurality of portions of the file to the plurality of stored patterns, a set of matching portions. The set of matching portions include one or more of the plurality of portions of the file. The one or more processors are configured to determine a score for each portion in the set of matching portions and provide information regarding the set of matching portions. The information includes the scores determined for each portion of the set of matching portions.

Depending on the specific features implemented, some embodiments may exhibit some, none, or all of the following technical advantages. In certain embodiments, malware detection may be enhanced by detecting malware in files for which virus signatures are inadequate or ineffective. Malware detection may also be enhanced by more easily adapting to new techniques used by malware authors. Other technical advantages will be readily apparent to one skilled in the art from the following figures, description and claims.

BRIEF DESCRIPTION OF THE DRAWINGS

For a more complete understanding of the present disclosure and its advantages, reference is made to the following descriptions, taken in conjunction with the accompanying drawings, in which:

FIG. 1A illustrates an example system for detecting malware using stored patterns;

FIG. 1B shows example contents of the terminal from FIG. 1A;

FIG. 1C shows example contents of the server from FIG. 1A;

DESCRIPTION OF EXAMPLE EMBODIMENTS

Figure 2:
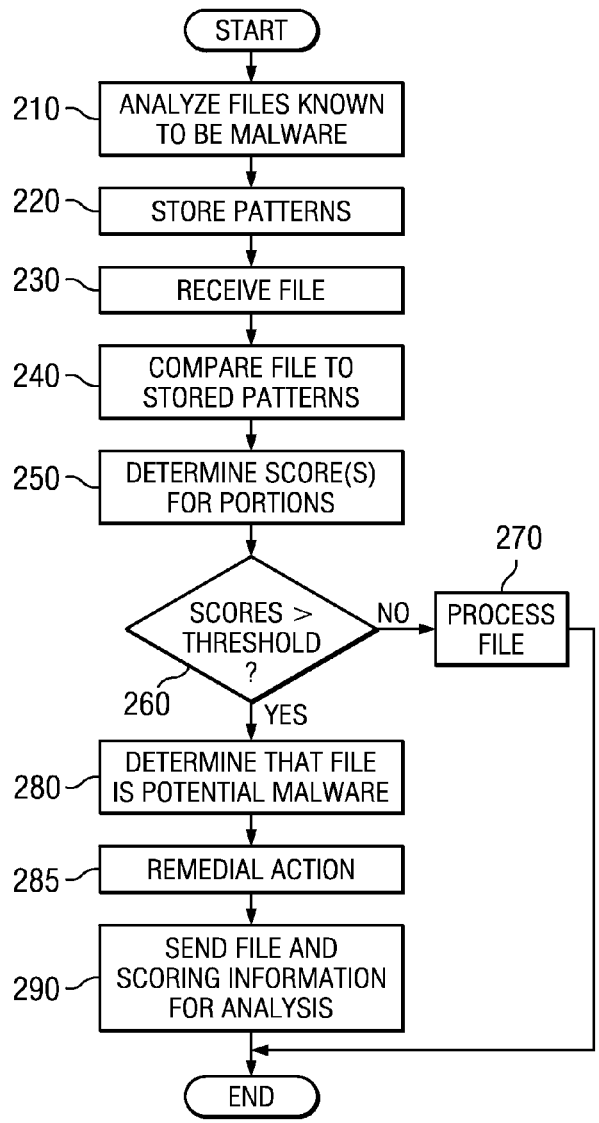
FIG. 2 is a flowchart illustrating one embodiment of detecting malware using stored patterns.

FIG. 1A illustrates an example system 100 for detecting malware in files. System 100 may facilitate communication in a network environment. Users 14-15 interact with server 20 through terminals 10. FIG. 1B is a diagram showing, in some embodiments, example contents of terminal 10. Terminal 10 comprises interface 16 (through which users 14-15 may interact with terminal 10) and display 12. FIG. 1C is a diagram showing, in some embodiments, example contents of server 20. Server 20 comprises memory 26, at least one central processing unit (CPU) 28 (and/or other suitable processor), and analysis module 29. Terminals 10, server 20, and review module 30 are communicatively coupled via network connections 22 and network 24. Analysis module 29 may be configured to analyze files 25 sent from users 14-15 and determine whether files 25 are (or include) malware or whether files 25 potentially are (or include) malware. Review module 30 may receive files 25 that have been determined by analysis module 29 to be malware (or potential malware) and facilitate further review and analysis of the file (e.g., by a human analyst). In some embodiments, malware may include viruses, trojans, worms, spyware, adware, scareware, crimeware, rootkits, and other malicious software.

In some embodiments, users 14-15 are clients, human users, or other entities that participate in a communication session. Users 14-15 may communicate with other users via network 24. A communication session may include an e-mail session, an instant messaging session, a peer-to-peer messaging session, a chat session, or other messaging sessions. Aspects of system 100, in various embodiments, may also be used in contexts where files are uploaded. For example, some or all of system 100 may be utilized in File Transfer Protocol (FTP) sessions, Wiki sessions, online message boards (such as forums), or other interactive environments. Users 14-15 may also be browsing the Internet.

Terminal 10 may include any suitable type of processing device that is capable of receiving and/or storing files. In some embodiments, terminal 10 represents a personal computer that may be used to access network 24. Alternatively, terminal 10 may be representative of a cellular telephone, an electronic notebook, a laptop, a personal digital assistant (PDA), or any other suitable device (wireless or otherwise: some of which can perform web browsing), component, or element capable of accessing one or more elements within system 100. Interface 16, which may be provided in conjunction with the items listed above, may further comprise any suitable interface for a human user such as a video camera, a microphone, a keyboard, a mouse, or any other appropriate equipment according to particular configurations and arrangements. In addition, interface 16 may be a unique element designed specifically for communications involving system 100. Such an element may be fabricated or produced specifically for matching applications involving a user.

Display 12, in some embodiments, is a computer monitor. Alternatively, display 12 may be a projector, speaker, or other device that allows users 14-15 to appreciate information that system 100 transmits.

Network 24 comprises one or more communicative platforms operable to exchange data or information emanating from users 14-15. Network 24 could be a plain old telephone system (POTS). Transmission of information emanating from the user may be assisted by management associated with server 20 or manually keyed into a telephone or other suitable electronic equipment. In other embodiments, network 24 could be any packet data network offering a communications interface or exchange between any two nodes in system 100. Network 24 may include any suitable combination of a local area network (LAN), metropolitan area network (MAN), wide area network (WAN), wireless local area network (WLAN), virtual private network (VPN), the Internet, intranet, and any other appropriate architecture or system that facilitates communications in a network or telephonic environment, including a combination of any networks or systems described above. In various embodiments, network connections 22 may include, but are not limited to, wired and/or wireless mediums which may be provisioned with routers and firewalls.

Server 20 is operable to receive from and to communicate information to terminal 10. In some embodiments, server 20 may comprise a plurality of servers or other equipment, each performing different or the same functions in order to receive and communicate information to terminal 10. Server 20 may include software and/or algorithms to achieve the operations for processing, communicating, delivering, gathering, uploading, maintaining, and/or generally managing data, as described herein. Additionally or alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations. In some embodiments, server 20 may comprise one or more clusters of virtual or hardware-based computing nodes, a distributed computing infrastructure, or other suitable forms of providing a software service using multiple computers. In some embodiments, server 20 may offer one or more services to users 14 and 15 via network 24 such as a messaging service, an e-mail service, an instant messaging service, a peer-to-peer messaging service, a chat service, an FTP service, a Wiki service, an online message board (such as a forum), or other interactive services.

Memory 26 may include any suitable combination of volatile or non-volatile memory. In some embodiments, memory 26 may include any suitable combination of one or more databases, file systems, tables, stacks, heaps, or other suitable storage structures. Memory 26 may store patterns 23, received files 25, and scoring data 27. Each of these examples are described below in greater detail.

In some embodiments, patterns 23 may be portions of files (e.g., such as previously received files 25 or other files) known to be malware or that contain malware. Patterns 23 may be used to determine whether content of received files 25 correspond to known malware. Patterns 23 may be text strings (i.e., a set of ASCII characters) and/or byte sequences. For example, if a MICROSOFT WORD document is known to contain malware (such as a macro), text or byte patterns of the malicious component(s) of the document may be stored as patterns 23. Such malicious components may include an exploit, shellcode, and/or a payload.

Patterns 23 may also be determined from metadata related to files that are known to be or contain malware. Patterns 23 may be scored and the scores may be stored with patterns 23 in memory 26. In some embodiments, the scores may indicate the likelihood that the pattern 23 is associated with known malware. For example, the scores may be rankings (such as high, medium, and low). As another example, the scores may be values that numerically represent a statistical correlation of the presence of pattern 23 in files known to be malware. The scores may be determined by analyzing a set of files known to be malware and performing statistical correlations regarding the presence of patterns 23 in the set of files known to be malware.

In some embodiments, files 25 may include one or more of the following in any suitable combination: data files, data records, email messages, attachments to email messages, and any other suitable target object for which malware detection may be appropriate. Users 14-15, using terminals 10, may send or receive files 25, such as word processing or multimedia files, via network 24 and server 20. For example, a user 14 may receive a MICROSOFT WORD file 25 sent from user 15 via server 20. Sending user 15 may have included (either knowingly or unknowingly) malware in file 25. As described below, analysis module 29 may be used to determine whether file 25 is malware or if file 25 should be considered as potential malware. Analysis module 29 may access or be provided files 25 in any other suitable manner.

In some embodiments, scoring data 27 may include scores associated with stored patterns 23. The scores may reflect the likelihood that a pattern of stored patterns 23 is associated with malware. For example, scoring data 27 may include rankings (such as "high," medium," and "low") indicating the likelihood that a pattern 23 is associated with malware. Scoring data 27 may be changed over time, depending the content of stored patterns 23. For example, as portions of malware are added to stored patterns 23, scoring data 27 may change. A score for a pattern 23 may be based on the statistical correlation between that pattern and files known to be malware.

Analysis module 29, which may be implemented using any suitable combination of hardware, firmware, and software, may be or include one or more tools that identify and classify files or programs (such as malware). For example, analysis module 29 may be or include the YARA malware identification and classification tool. Analysis module 29 may be configured to analyze files 25 sent or received by users 14 and 15 to determine whether the files are malware or are potential malware. Files 25 received by server 20 that will be processed by analysis module 29 may be stored in memory 26.

In some embodiments, analysis module 29 may generate one or more scores for a file 25 sent or received by user 14 or 15 by comparing portions of file 25 (such as text strings, byte sequences, or hexadecimal strings) to patterns 23 taken from files known to be malware. The scores may be stored in scoring data 27 that contains scoring data. The scores may indicate whether there is a match or close correspondence between the portions of file 25 and patterns 23 and/or indicate the likelihood that the portions of file 25 is associated with known malware. For example, analysis module 29 may determine that a portion of file 25 matches a byte sequence that corresponds to an exploit stored in patterns 23. Analysis module 29 may determine the score stored with the matching pattern 23 to the portion of file 25. As discussed above, examples of the scores may include rankings (such as "high", "medium", and "low") or include values that numerically represent a statistical correlation of the presence of pattern 23 in files known to be malware.

In some embodiments, the scores may be compared to one or more thresholds. File 25, score(s) associated with file 25, and/or threshold(s) (e.g., that are compared to scores associated with file 25) may be stored in scoring data 27. File 25 may be determined to be potential malware or actual malware based on this comparison. For example, if a score is higher than the threshold, then file 25 may be determined to be potential malware. As another example, if the score is at or below the threshold, then file 25 may be determined not to be potential malware. A threshold may be set indicating that if a certain number of portions of file 25 are associated with scores that are higher than other thresholds, then the file should be considered potential malware. For example, analysis module 29 may be configured to indicate that file 25 is potential malware if it determines that three or more portions of file 25 receive at least a "medium" score as a result of comparing portions of file 25 to patterns 23.

In some embodiments, analysis module 29 may be configured to cause information regarding portions of file 25 that match patterns 23 to be sent to review module 30. Such information may include one or more of: file 25, the matching portions of file 25, a description of the matching portions of file 25 (e.g., whether the matching portions of file 25 is an exploit, a shellcode, a payload, metadata, or a name of a known malware fragment), score(s) corresponding to the matching portions of file 25, the aspects of patterns 23 that matched with the matching portions of file 25, or other information about file 25. This may be used by a human analyst to further analyze file 25. For example, the human analyst may examine a portion of file 25 that matched with patterns 23 as well as a ranking associated with that portion to facilitate a determination of whether file 25 is malware.

In some embodiments, analysis module 29 may be located in terminals 10 such that file(s) 25 may be analyzed at a terminal 10. Memory 26 may be located at terminal 10 as well or memory 26 may be located at server 20. For example, if memory 26 is located at terminal 10, information used by analysis module 29 when analyzing file 25 (such as patterns 23 from files known to be malware) may be available at terminal 10. As another example, if aspects of memory 26, such as patterns 23, are stored on server 20, analysis module 29 located in terminal 10 may communicate with server 20 to receive such information before or while analyzing file 25 located at terminal 10.

Review module 30, which may be implemented using any suitable combination of hardware, firmware, and software, may receive files 25 that have been compared to patterns 23 and have been associated with scores by analysis module 29 as well as information used or generated by analysis module 29 when analyzing files 25. Review module 30 may provide access to file 25 and information regarding files 25 to a human analyst. As examples, the information provided by review module 30 may include scores associated with files 25 and information regarding the context in which file 25 was found (e.g., original directory, network location, originator of the file, and e-mail message to which the file was attached). This may provide an advantage in that new malware techniques may be discovered by a human analyst. This may also provide an advantage because the human analyst may be able to determine that file 25 is actually malware and system 100 may learn from the techniques used in the malware. As an example, the information may be provided to a human analyst using analysis console 370 of FIG. 3 (discussed below).

FIG. 2 is a flowchart illustrating an example method for detecting malware using stored patterns. For example, the method may provide one embodiment of comparing a file 25 to patterns 23 using analysis module 29 of FIG. 1C. In general, the steps illustrated in FIG. 2 may be combined, modified, or deleted where appropriate, and additional steps may also be added to the example operation. Furthermore, the described steps may be performed in any suitable order. In some embodiments, the steps described below may be performed by any suitable combination of the elements discussed above with respect to FIGS. 1A-1C.

At step 210, in some embodiments, files known to be malware may be analyzed. For example, server 20 may receive files in communications from users 14-15 of FIG. 1A. It may be determined that some or all of the files are malware. In some embodiments, such a determination may be based on one or more malware detection schemes (e.g., signature scanning, heuristic analysis, and behavioral analysis), on a review of the files by a human analyst, and/or on other factors. The files known be malware may be stored by server 20 of FIG. 1A. In some embodiments, the files may be processed before, during, or after being stored. For example, statistical analysis may be performed on characteristics of the files known to be malware. Data regarding statistical correlations may be generated as a result of processing the files.

At step 220, in some embodiments, patterns 23 from files known to be malware (analyzed at step 210) may be stored in server 20. Patterns 23 stored at this step may be aspects of malware analyzed at step 210. Examples of such aspects stored at this step may include: exploits, shellcode, payload, and metadata. Patterns 23 stored at this step may be identified by a human analyst or by automated processes (e.g., signature scanning, heuristic analysis, and behavioral analysis). Scores associated with the patterns 23 may also be stored at step 220 may also be stored at this step. In some embodiments, the scores may indicate the likelihood that the patterns 23 are associated with known malware. For example, the scores may be rankings (such as high, medium, and low). As another example, the scores may be values that numerically represent a statistical correlation of the presence of the patterns 23 in files known to be malware. The scores may be determined by analyzing a set of files known to be malware and performing statistical correlations regarding the presence of the patterns 23 in the set of files known to be malware. As examples, one or more aspects of the following scoring information may be stored at this step:

MEDIUM 128_bytekey_exe_skyline_possible
MEDIUM 4 byte_xor_shellcode
MEDIUM CVE 2010_0188
MEDIUM fvck_xor_exe_header
MEDIUM increment_xor_ror_3
MEDIUM iph4code_shellcode_marker
MEDIUM Likely_PDF_CVE_2011_0611
LOW pdf_cve_2009_4324
LOW pdf_cve_2010_0188
LOW PPT_CVE_2006_0022
LOW rev_xor_upack
LOW malcode_in_screensaver_exe
LOW CVE_2010_0188
LOW inc_xor_payload
LOW chm LOW JS_Hyphenated_Code
LOW exe_with_PDF
LOW packed_exe
LOW Encrypted_PDF_exploit
LOW mal_exe
LOW Dropped_Exe
LOW RTF_embedded_exe
LOW shellcode_hash_resolution_0x30
LOW shellcode_readwritefile
LOW Stuxnet_exe
LOW win32_code_in_xls
LOW chunk_xor_header
LOW shellcode_egghunt_83fc
LOW shellcode_xor_e9_proluge
HIGH 01D2AB90_xor_payload
HIGH 99887766_xor_payload
HIGH add_exe_headers
HIGH CVE_2010_0188
HIGH CVE_2010_0188_simple_doc_id
HIGH Excel_NibbleswapMZ_shellcode
HIGH exe_dec66
HIGH FZH_EXE_Payloads
HIGH_js_image_cve_2010_0188
HIGH known_bad_pdf_metadata
HIGH Office_CVE_2010_3970
HIGH Office_CVE_2010_3970
HIGH PDF_CVE_2009_3459
HIGH PDF_FILE_LAUNCH
HIGH PDF_Flash_Exploit
HIGH PDF_malformed_version
HIGH PDF_obfuscated_JS_tags
HIGH PDF_topmostform
HIGH pdf_u3d_exploit
HIGH Rar_Known_Porn
HIGH ROL_4_exe_header
HIGH rolling_xor_exe_marker
HIGH rol_riew_xor_shellcode
HIGH shellcode_dec66
HIGH shellcode_deobfuscator
HIGH shellcode_ecx_getip
HIGH shellcode_function_resolve_plain
HIGH shellcode_jnz_nop
HIGH shellcode_like_rtl_3700
HIGH shellcode_lodsb_xor_stosb_decode
HIGH shellcode_new_excel_bd
HIGH shellcode_reverse_xor
HIGH shellcode_xor_decode
HIGH shellcode_xor_decode_4_byte
HIGH swap_xor_exe_headers
HIGH TDSS_TDL4_exe
HIGH WRI_Exploit
HIGH xor_encoded_payload_12446492
HIGH xor_faceold_shellcode
HIGH xor_fffdfcabff23d5
HIGH xor_single_exe_headers
HIGH xor_t_exe_header Processing files known to be malware using the techniques described above may provide an advantage because, in some embodiments, detection of potential malware in files may be adaptable and learn from new malware techniques by processing more or newer files known to be malware.

At step 230, in some embodiments, one or more files 25 are received at server 20 from a user, such as one of users 14 or 15. As examples, a user may submit a message or other communication that includes one or more files 25. Server 20 may be configured to determine whether or not the file(s) 25 received at this step is suspected to be malware and/or may be configured to provide information regarding the file(s) to a human analyst to facilitate the human analyst's determination of whether the file(s) are malware. The file(s) 25 received at step 230 may be stored by server 20 in memory 26.

At step 240, in some embodiments, the file(s) 25 received at step 230 may be compared to the patterns stored at step 220. This may be accomplished by analysis module 29 of FIG. 1C. The comparison may be performed to determine which portions of the file 25 match any of the patterns 23 stored at step 220. In some embodiments, matches may be determined when there is a close resemblance between a portion of the file 25 and a pattern 23. This may be determined using a threshold. For example, a threshold may specify that an 80% correspondence between a portion of a file 25 and a pattern 23 would indicate a match. This may be advantageous, in some embodiments, because malware may be detected even if it has been modified. For example, malware may evolve by changing items such as the payload. Signature-based detection may not detect such malware because part of the malware has changed. The exploit used by the evolving malware may remain the same. Matching the patterns 23 stored at step 220 may provide the ability to detect evolving malware because one of the patterns 23 used to match may be the exploit pattern of the evolving malware.

At step 250, in some embodiments, one or more scores may be determined for the portions of the file 25 received at step 230 that match with the patterns 23 stored at step 220 (determined at step 240). This step may be performed by analysis module 29 of FIG. 1C. The scores may be determined based on the scores stored with the patterns 23 at step 220. For example, if a portion of the file 25 matched an exploit pattern 23 stored at step 220, the score assigned to the exploit pattern (e.g., a ranking of "medium") may be also assigned to the portion of the file 25. In some embodiments, the portion of the file 25 may be scored based on scores of other portions of the file 25. For example, a first portion of the file 25 may be matched with an exploit pattern 23 that has a stored ranking of "low". A second portion of the file 25 may be matched with a payload pattern 23 that has a stored ranking of "high". The score for the first portion of the file 25 may be a rank of "medium" due to the presence of the payload pattern 23. As another example, if numerical values are used for scores, then a score for a particular portion of the file 25 may be increased, decreased, averaged, or otherwise modified based on the presence or lack of matches of other portions of the file to other stored patterns 23. The determined scores may reflect the frequency with which each portion matches patterns 23 in files known to be malware.

In some embodiments, a portion of the file 25 may be given a relatively higher score if the matching pattern 23 has a higher statistical correlation with files that are known to be malware than other patterns 23. For example, a portion of the file 25 that matches patterns 23 that are present in multiple files known to be malware may be assigned a score with a higher value in proportion to the number of corresponding files known to be malware. As another example, such a portion of the file 25 may be assigned a score that corresponds to a ranking, such as a "high" or "medium" rank. In some embodiments, the scores may be weighted. For example, the scores associated with certain patterns 23 may be weighted more than others because they may be a better indicator of whether a file 25 is potential malware or not.

At step 260, in some embodiments, the score(s) determined at step 250 may be compared to one or more thresholds. This step may be performed by analysis module 29 of FIG. 1C. One or more scores determined at step 250 may be combined into an overall score at this step. For example, the scores may be summed. As another example, the scores may be averaged. As another example, the scores may be summed and normalized. In some embodiments, where the scores include ranks such as "high," "medium," and "low," the scores may be combined by using the highest rank or the rank that appears most often. For example, if there were two portions of the file that were scored as "low," three portions of the file that were scored "medium," and one portion of the file that was scored as "high," then an overall score of "medium" may be determined. If the highest score is taken, then the overall score in this example would be determined to be "high." If the overall score is greater than the threshold then step 270 may be performed. If the overall score is less than or equal to the threshold then step 280 may be performed. The threshold may be determined by a given set of tolerance parameters that may be configured to classify a file as potential or suspected malware. For example, if the threshold is set higher, then there would be a correspondingly lower tolerance for determining that a file 25 is potential malware using the example scoring method discussed above. If the threshold is set lower, then there would be a correspondingly higher tolerance for determining that a file 25 is potential malware using the same example scoring method. The threshold may vary based on the context associated with the file(s) 25 received at step 230. For example, one threshold may be set if the file 25 was received as part of an email whereas another threshold may be set for a file 25 that was downloaded from a local or corporate intranet.

In some embodiments, multiple thresholds may be used at step 260. For example, if an overall score of the scores determined at step 250 is below two thresholds or equal to the lower of the two thresholds, the file 25 may be determined not to be potential malware. In this example, if the overall score is between the two thresholds or equal to the higher of the two thresholds, the file 25 may be determined to be potentially malware. Further, if the overall score is above the two thresholds, then the file 25 may be considered as highly likely to be malware. In some embodiments, comparison to multiple thresholds may occur on each scored portion of the file 25 rather than on an overall score for the file 25. For example, if there were two portions of the file 25 that were scored as "low," three portions of the file 25 that were scored "medium," and one portion of the file 25 that was scored as "high," then a threshold of "medium" may be compared to each of these scores. Another threshold may be set such that if the threshold compared to each portion is met or exceeded three times, then the file 25 should be considered as potential malware. In this example, four portions of the file 25 met or exceeded the threshold of "medium." As a result, the file 25 may be considered potential malware.

At step 270, in some embodiments, the file(s) 25 received at step 230 may be processed. This may occur because it has been determined that the file(s) 25 received at step 230 are not potential malware. The file(s) 25 may have been determined not to be potential malware by determining that score(s) generated for the file(s) 25 at step 250 are not greater than a threshold. Processing the file(s) 25 at this step may include different actions depending on the context associated with the file(s) 25 received at step 230. For example, if a file 25 received at step 230 is an attachment to an e-mail, then processing the file 25 at step 270 may include allowing the e-mail with the attachment to be delivered or received. If a file 25 received at step 230 was downloaded as part of a file transfer session, then processing the file 25 at this step may include allowing the file to remain stored and not deleting the file 25.

At step 280, in some embodiments, the file(s) 25 received at step 230 may be determined to be potential malware or actual malware. This may be performed by analysis module 29 of FIG. 1C. For example, if the sum of the scores generated at step 250 was determined to be greater than the threshold at step 260, then the file 25 at step 230 may be determined to be potential malware. At step 285, in some embodiments, remedial action may be performed in response to determining that the file 25 received at step 230 is potential malware. For example, such actions may include removing the file 25, sanitizing the file 25, quarantining the file 25, and/or sending the file 25 for review by human analysts. For example, in a messaging context, an indication that the attachment should be removed may be sent to a mail server or agent, which may then remove the attachment from the message that is to be delivered at this step. In some embodiments, actions such as removing attachments from messages may be performed by server 20 and the modified message may be sent back to a mail server or agent for delivery or an edited message may be sent by server 20. As another example, if server 20 was being used as a service by another entity (such as a desktop or network security agent), a report may be sent to the entity that may include the determination that the file 25 is potential malware and information related to the determination (such as the scoring data or the matching patterns 23).

At step 290, in some embodiments, file(s) 25 determined to be potential malware may be sent for further analysis. For example, the file(s) 25 may be sent to a human analyst for further analysis. Information generated or used in steps 210-260 may also be sent to a human analyst, such as: the file 25, the matching portions of the file 25, a description of the matching portions of the file 25 (e.g., whether the matching portions of file is an exploit, a shellcode, a payload, metadata, or a name of a known malware fragment), score(s) corresponding to the matching portions of the file 25, the matching patterns 23 determined at step 240, or information about the file 25 (e.g., name, type, size, date created, and date modified). This may be used by a human analyst to further analyze the file 25. For example, the human analyst may examine a portion of the file 25 that matched with patterns 23 stored at step 220 as well as a ranking associated with that portion to facilitate a determination of whether the file 25 is malware.

In some embodiments, steps 260, 270, 280, and 285 may not be performed. For example, after performing step 250, step 290 may be performed and information may be sent to a human analyst to review the file 25 received at step 230. This may be advantageous in that it may provide a human analyst with a beneficial research tool that may automate analysis. In some embodiments, if the human analyst determines that the file 25 is malware, then step 285 may be performed even though steps 260, 270, and 280 were not performed.

Figure 3:
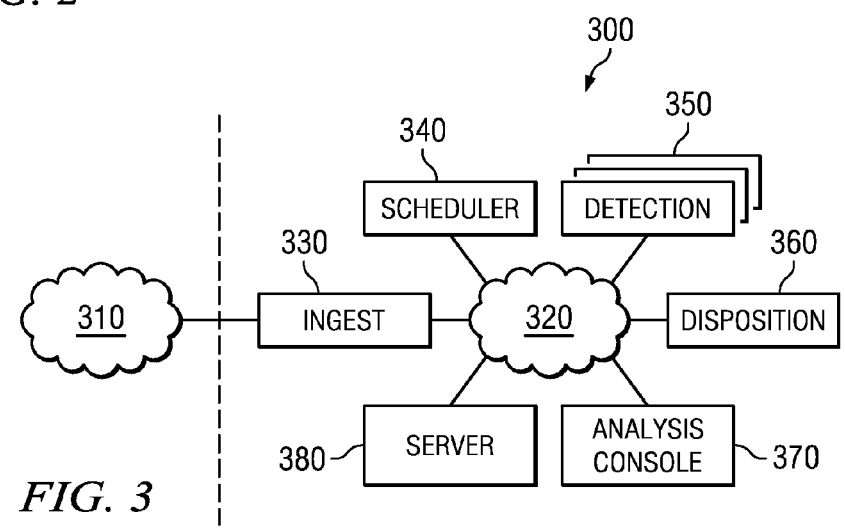
FIG. 3 is a block diagram illustrating one embodiment of a system that detects malware using multiple techniques.

FIG. 3 is a block diagram illustrating one embodiment of system 300 that is operable to detect malware. The block diagram includes external network 310 and internal network 320. Internal network 320 couples ingest block 330, scheduler block 340, detection blocks 350, disposition block 360, analysis console 370 and server 380. By being coupled to internal network 320, blocks 330-380 may communicate with each other. In some embodiments, communication between blocks 330-380 utilizing internal network 320 may be indirect. For example, one or more of blocks 330-380 may be in a demilitarized zone (DMZ) that may limit direct communication between blocks 330-380. In some embodiments, blocks 330-380 may represent hardware, software or a combination of the two. Blocks 330-380 may be implemented on the same or different hardware in various suitable combinations.

Networks 310 and 320, in some embodiments, may be communicative platforms operable to exchange data or information. In some embodiments, the networks may include packet data networks offering communication interfaces or exchanges between any two nodes in system 300. Networks 310 and 320 may each be or include any local area network (LAN), metropolitan area network (MAN), wide area network (WAN), wireless local area network (WLAN), virtual private network (VPN), intranet, Internet, plain old telephone system (POTS), or any other appropriate architecture or system that facilitates communications in a network or telephonic environment, including a combination of any networks or systems described above. The networks may also include wireless technology such as WiMAX, LTE, or any of a variety of cellular data networks. In some embodiments, networks 310 and 320 may each include firewalls or other equipment or software that create security zones and/or secure networks such as DMZs. One or more of blocks 330-380 may be located in one more of such security zones and/or secure networks in some embodiments. For example, analysis console 370 may be in a DMZ that is separate from ingest block 330 and detection block 350. As another example, ingest block 330 may be in a different security zone than detection block 350.

As described above, embodiments of the present disclosure are operable to detect malware. In particular, embodiments of the present disclosure are operable to detect malware in one or more files. A file may include one or more of the following in any suitable combination: a data file, a data record, an email message, an attachment to an email message, and any other suitable target object for which malware detection may be appropriate.

In operation, in some embodiments, ingest block 330 may receive a file or set of files from network 310. In some embodiments, a file may include several files embedded within the file. For example, a ZIP file or other archive or compressed file type, may be received by ingest block 330. Ingest block 330 may extract and cause to be analyzed the files that are contained within the received ZIP file. Ingest block 330 may analyze the file(s) and determine one or more tests that should be performed on the file(s) in order to determine whether the file is malware. Detection blocks 350 may perform the test(s) that were determined by ingest block 330 in accordance with scheduling performed by scheduler block 340. Disposition block 360 may utilize the results of the tests performed by detection blocks 350 to determine what should be done with the file(s). In some cases, disposition block 360 will send the file(s) to analysis console 370 for further review by a human analyst. In some embodiments, disposition block 360 may respond to the results of detection blocks 350 regardless of whether it sends the file(s) to analysis console 370. For example, disposition block 360 may determine that the file(s) should be quarantined and send the file to server block 380 to quarantine the file. In some embodiments, disposition block 360 may also determine that the file(s) are not malware and may perform suitable corresponding actions with nodes coupled to external network 310. For example, disposition block 360 may cause the delivery of a message to which the analyzed file(s) were attached in response to the determination by disposition block 360 that the file(s) are not malware.

In some embodiments, detection blocks 350 may apply various techniques of malware detection. Detection blocks 350 may be implemented on a variety of types of hardware. They may be configured in a blade architecture or on physical hosts. Detection blocks 350 may also be configured utilizing clusters or other suitable distributed computing architectures. Detection blocks 350 may utilize virtualization or may themselves be virtual machines. Detection blocks 350 may be used to apply a variety of malware detection schemes to a file (which, in some embodiments, may include one or more URLs). In some embodiments, some of detection blocks 350 may be specialized such that each detection node may be configured to apply a type of malware detection scheme. For example, a detection block 350 may be configured to apply behavior-based malware detection schemes while another detection block 350 may be configured to apply metadata-based detection schemes where metadata of a file is analyzed. In yet another example, a detection block 350 may be configured to analyze a file by comparing it to stored patterns taken from files known to be malware, as described above with respect to FIGS. 1A-1C and FIG. 2.

Some or all of system 300, in some embodiments, may be utilized to detect malware in a variety of contexts. In some embodiments, accessing a "file" may comprise accessing one or more URLs. For example, aspects of system 300 may be used to detect malware in a messaging environment. Suitable messaging environments include, but are not limited to, an e-mail environment, an instant messaging environment, a peer-to-peer messaging environment, a chat environment, or other messaging environments. Aspects of system 300, in some embodiments, may also be used in contexts where files are uploaded. For example, some or all of system 300 may be utilized in File Transfer Protocol (FTP) sessions, Wiki sessions, online message boards (such as forums), or other interactive environments. Aspects of system 300 may also be used in a Web browsing context. In such a context, some or all of system 300 may analyze requested Web pages and determine if they are malicious. System 300 may be used to detect malware in these and other contexts utilizing suitable configurations of ingest block 330. For example, if the context is an e-mail context, then ingest block 330 may be configured as a Mail Transfer Agent (MTA) that is able to handle e-mail messages. Configured in this manner, ingest block 330 may analyze a message, an attachment to the message, or both the message and any attachment(s) to the message. When some or all of system 300 operates in a context where files are uploaded, such as in an FTP session, ingest block 330 may be configured to access the file(s) associated with the FTP session and perform analysis on the file(s). When aspects of system 300 are used in a Web browsing context, ingest block 330 may be configured to retrieve an address associated with an Internet site or files associated with the Internet site and analyze such items.

In some embodiments, some or all of system 300 may be provided as a service to various agents. For example, an agent analyzing traffic passing through a particular boundary of a network may transmit certain traffic (such as one or more files) to aspects of system 300 for analysis and these or other aspects of system 300 may report to the agent the results of the analysis. As another example, an agent residing on a workstation or laptop computer used by end users may similarly transmit one or more files to some or all of system 300 for analysis and receive the results of the analysis. A particular example of such an agent is a client-located module capable of analyzing the downloaded contents of web-based email (e.g., GMAIL by GOOGLE; HOTMAIL by WINDOWS, or any other suitable web-based email program). As another example, a collaborative environment such as one associated with a cross-domain document management system (e.g., RAYTHEON's CHAIN environment) may utilize this service to check files hosted on the platform for malware. In some embodiments, aspects of system 300 may be offered as a service using Web service technology, such as Javascript-based Application Programming Interfaces (APIs), Simple Object Access Protocol (SOAP) Remote Procedure Calls (RPCs), and/or other suitable network based APIs.

Figure 4:
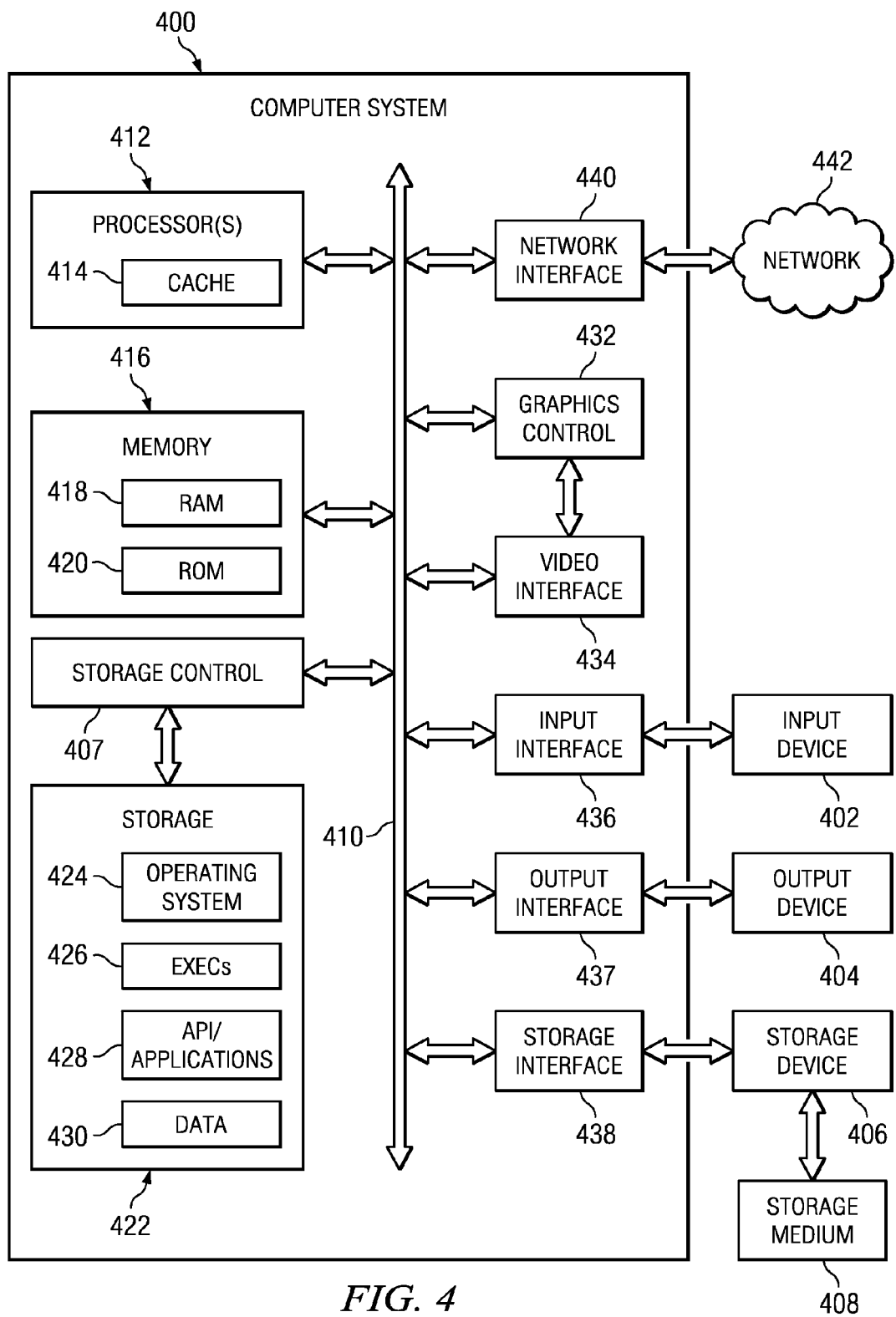
FIG. 4 illustrates an example computer system suitable for implementing one or more portions of some embodiments.

FIG. 4 illustrates an example computer system 400 suitable for implementing one or more portions of some embodiments. Although the present disclosure describes and illustrates a particular computer system 400 having particular components in a particular configuration, the present disclosure contemplates any suitable computer system having any suitable components in any suitable configuration. Moreover, computer system 400 may have take any suitable physical form, such as for example one or more integrated circuit (ICs), one or more printed circuit boards (PCBs), one or more handheld or other devices (such as mobile telephones or PDAs), one or more personal computers, one or more super computers, one or more servers, and one or more distributed computing elements. One or more components of FIGS. 1A-1C and 3 and one or more steps of FIG. 2 may be implemented using all of the components, or any appropriate combination of the components, of computer system 400 described below.

Computer system 400 may have one or more input devices 402 (which may include a keypad, keyboard, mouse, stylus, or other input devices), one or more output devices 404 (which may include one or more displays, one or more speakers, one or more printers, or other output devices), one or more storage devices 406, and one or more storage medium 408. An input device 402 may be external or internal to computer system 400. An output device 404 may be external or internal to computer system 400. A storage device 406 may be external or internal to computer system 400. A storage medium 408 may be external or internal to computer system 400. In some embodiments, terminals 10 and server 20 of FIG. 1A may be implemented using some or all of the components described above included in computer system 400.

System bus 410 couples subsystems of computer system 400 to each other. Herein, reference to a bus encompasses one or more digital signal lines serving a common function. The present disclosure contemplates any suitable system bus 410 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 400 includes one or more processors 412 (or central processing units (CPUs)). A processor 412 may contain a cache 414 for temporary local storage of instructions, data, or computer addresses. Processors 412 are coupled to one or more storage devices, including memory 416. Memory 416 may include random access memory (RAM) 418 and read-only memory (ROM) 420. Data and instructions may transfer bidirectionally between processors 412 and RAM 418. Data and instructions may transfer unidirectionally to processors 412 from ROM 420. RAM 418 and ROM 420 may include any suitable computer-readable storage media.

Computer system 400 includes fixed storage 422 coupled bi-directionally to processors 412. Fixed storage 422 may be coupled to processors 412 via storage control unit 407. Fixed storage 422 may provide additional data storage capacity and may include any suitable computer-readable storage media. Fixed storage 422 may store an operating system (OS) 424, one or more executables (EXECs) 426, one or more applications or programs 428, data 430 and the like. Fixed storage 422 is typically a secondary storage medium (such as a hard disk) that is slower than primary storage. In appropriate cases, the information stored by fixed storage 422 may be incorporated as virtual memory into memory 416. In some embodiments, fixed storage 422 may include network resources, such as one or more storage area networks (SAN) or network-attached storage (NAS). In some embodiments, memory 26, storage structures 27, and analysis module 29 of FIGS. 1A and 1C as well as blocks 330-380 of FIG. 3 may be implemented using configurations such as the description of memory 416 above.

Processors 412 may be coupled to a variety of interfaces, such as, for example, graphics control 432, video interface 434, input interface 436, output interface 437, and storage interface 438, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 440 may couple processors 412 to another computer system or to network 442. Network interface 440 may include wired, wireless, or any combination of wired and wireless components. Such components may include wired network cards, wireless network cards, radios, antennas, cables, or any other appropriate components. With network interface 440, processors 412 may receive or send information from or to network 442 in the course of performing steps of some embodiments. Some embodiments may execute solely on processors 412. Some embodiments may execute on processors 412 and on one or more remote processors operating together. In some embodiments, processors 412 may be used to implement analysis module 29 of FIG. 1C and/or may perform the steps specified in instructions or code included in analysis module 29 of FIG. 1C as well as blocks 330-380 of FIG. 3.

In a network environment, where computer system 400 is connected to network 442, computer system 400 may communicate with other devices connected to network 442. Computer system 400 may communicate with network 442 via network interface 440. For example, computer system 400 may receive information (such as a request or a response from another device) from network 442 in the form of one or more incoming packets at network interface 440 and memory 416 may store the incoming packets for subsequent processing. Computer system 400 may send information (such as a request or a response to another device) to network 442 in the form of one or more outgoing packets from network interface 440, which memory 416 may store prior to being sent. Processors 412 may access an incoming or outgoing packet in memory 416 to process it, according to particular needs.

Some embodiments involve one or more computer-storage products that include one or more tangible, computer-readable storage media that embody software for performing one or more steps of one or more processes described or illustrated herein. In some embodiments, one or more portions of the media, the software, or both may be designed and manufactured specifically to perform one or more steps of one or more processes described or illustrated herein. In addition or as an alternative, in some embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In some embodiments, software may be machine code which a compiler may generate or one or more files containing higher-level code which a computer may execute using an interpreter.

As an example and not by way of limitation, memory 416 may include one or more tangible, non-transitory, computer-readable storage media embodying software and computer system 400 may provide particular functionality described or illustrated herein as a result of processors 412 executing the software. Memory 416 may store and processors 412 may execute the software. Memory 416 may read the software from the computer-readable storage media in mass storage device 416 embodying the software or from one or more other sources via network interface 440. When executing the software, processors 412 may perform one or more steps of one or more processes described or illustrated herein, which may include defining one or more data structures for storage in memory 416 and modifying one or more of the data structures as directed by one or more portions the software, according to particular needs. In some embodiments, memory 26, storage structures 27, and analysis module 29 of FIGS. 1A and 1C as well as blocks 330-380 of FIG. 3 may be implemented using configurations such as the description of memory 416 above.

In some embodiments, the described processing and memory elements (such as processors 412 and memory 416) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing. In addition or as an alternative, computer system 400 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although several embodiments have been illustrated and described in detail, it will be recognized that modifications and substitutions are possible without departing from the spirit and scope of the appended claims.

What is claimed is:

1. A method comprising:
   identifying, by at least one processor, a plurality of portions of a file;
   comparing, by the at least one processor, the plurality of portions of the file to a plurality of stored patterns, the plurality of stored patterns comprising portions of known malware;
   determining, by at least one processor, from the plurality of portions of the file and based on the comparing of the plurality of portions of the file to the plurality of stored patterns comprising portions of known malware, a set of matching portions, the set of matching portions comprising one or more of the plurality of portions of the file;
   determining, by at least one processor, a first score for each portion in the set of matching portions;
   determining an overall score for the file as a function of the first scores;
   comparing the overall score to a threshold to determine whether the file comprises malware, wherein the threshold is based on the context of how the file was received; and
   providing, by at least one processor, information regarding the set of matching portions, the information comprising the first score determined for each portion of the set of matching portions and the overall score;
   wherein each first score is determined based on the frequency with which each respective portion in the set of matching portions occurs in the plurality of stored patterns.

2. The method of claim 1, wherein each first score comprises a ranking of a likelihood that each respective portion in the set of matching portions is associated with malware.

3. The method of claim 1, wherein comparing the plurality of portions of the file to the plurality of stored patterns comprises comparing byte sequences or text strings.

4. The method of claim 1, wherein the information is provided to a human analyst to assist in determining whether the file is malware.

5. The method of claim 1, wherein the information further comprises a description of each portion in the set of matching portions.

6. The method of claim 1, further comprising:
   in response to determining the first score for each portion in the set of matching portions, determining, by the at least one processor, that the file is potential malware; and
   in response to determining that the file is potential malware, performing , by the at least one processor, remedial action regarding the file.

7. A system comprising:
   at least one computer-readable medium; and
   one or more processors configured to:
      identify a plurality of portions of a file;
      compare the plurality of portions of the file to a plurality of stored patterns, the plurality of stored patterns comprising portions of known malware;
      determine, from the plurality of portions of the file and based on the comparing of the plurality of portions of the file to the plurality of stored patterns comprising portions of known malware, a set of matching portions, the set of matching portions comprising one or more of the plurality of portions of the file;
      determine a first score for each portion in the set of matching portions;
      determine an overall score for the file as a function of the first scores;
      compare the overall score to a threshold to determine whether the file comprises malware, wherein the threshold is based on the context of how the file was received; and
      provide information regarding the set of matching portions, the information comprising the first score determined for each portion of the set of matching portions and the overall score;
      wherein the one or more processors are configured to determine each first score based on the frequency with which each respective portion in the set of matching portions occurs in the plurality of stored patterns.

8. The system of claim 7, wherein each first score comprises a ranking of a likelihood that each respective portion in the set of matching portions is associated with malware.

9. The system of claim 7, wherein the one or more processors are configured to compare the plurality of portions of the file to the plurality of stored patterns by comparing byte sequences or text strings.

10. The system of claim 7, wherein the one or more processors are configured to provide the information to a human analyst to assist in determining whether the file is malware.

11. The system of claim 7, wherein the information further comprises a description of each portion in the set of matching portions.

12. The system of claim 7, wherein the one or more processors are further configured to:
- determine that the file is potential malware in response to determining the first score for each portion in the set of matching portions; and
- perform remedial action regarding the file in response to determining that the file is potential malware, performing remedial action regarding the file.

13. At least one non-transitory computer-readable medium comprising instructions that, when executed by one or more processors, are configured to:
- identify a plurality of portions of a file;
- compare the plurality of portions of the file to a plurality of stored patterns, the plurality of stored patterns comprising portions of known malware;
- determine, from the plurality of portions of the file and based on the comparing of the plurality of portions of the file to the plurality of stored patterns comprising portion of known malware, a set of matching portions, the set of matching portions comprising one or more of the plurality of portions of the file;
- determine a first score for each portion in the set of matching portions;
- determine an overall score for the file as a function of the first scores;
- compare the overall score to a threshold to determine whether the file comprises malware, wherein the threshold is based on the context of how the file was received; and
- provide information regarding the set of matching portions, the information comprising the first score determined for each portion of the set of matching portions and the overall score;
- wherein the instructions are configured to determine each first score based on the frequency with which each respective portion in the set of matching portions occurs in the plurality of stored patterns.

14. The at least one non-transitory computer-readable medium of claim 13, wherein each first score comprises a ranking of a likelihood that each respective portion in the set of matching portions is associated with malware.

15. The at least one non-transitory computer-readable medium of claim 13, wherein the instructions are configured to compare the plurality of portions of the file to the plurality of stored patterns by comparing byte sequences or text strings.

16. The at least one non-transitory computer-readable medium of claim 13, wherein the instructions are configured to provide the information to a human analyst to assist in determining whether the file is malware.

17. The at least one non-transitory computer-readable medium of claim 13, wherein the information further comprises a description of each portion in the set of matching portions.

18. The at least one non-transitory computer-readable medium of claim 13, wherein the instructions are further configured to:
- determine that the file is potential malware in response to determining the first score for each portion in the set of matching portions; and
- perform remedial action regarding the file in response to determining that the file is potential malware, performing remedial action regarding the file.

* * * * *